July 23, 1946.  W. H. McCOLLISTER  2,404,583
TIRE REMOVING TOOL
Filed June 1, 1944  4 Sheets-Sheet 1

INVENTOR
WILLIAM H. McCOLLISTER
BY
ATTORNEYS

July 23, 1946. W. H. McCOLLISTER 2,404,583
TIRE REMOVING TOOL
Filed June 1, 1944 4 Sheets-Sheet 2

INVENTOR
WILLIAM H. McCOLLISTER
BY Ely + Frye
ATTORNEYS

July 23, 1946.  W. H. McCOLLISTER  2,404,583
TIRE REMOVING TOOL
Filed June 1, 1944  4 Sheets-Sheet 3
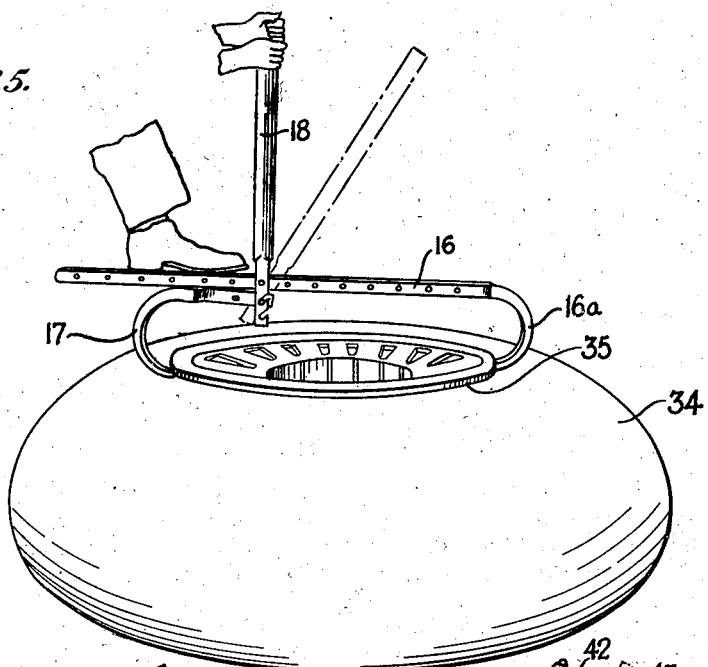
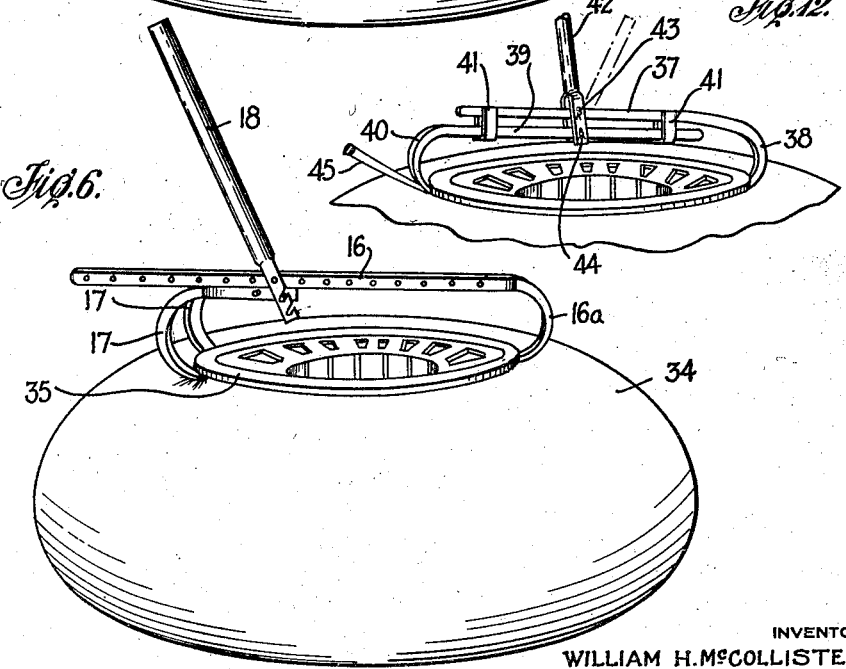
INVENTOR
WILLIAM H. McCOLLISTER
BY
ATTORNEYS

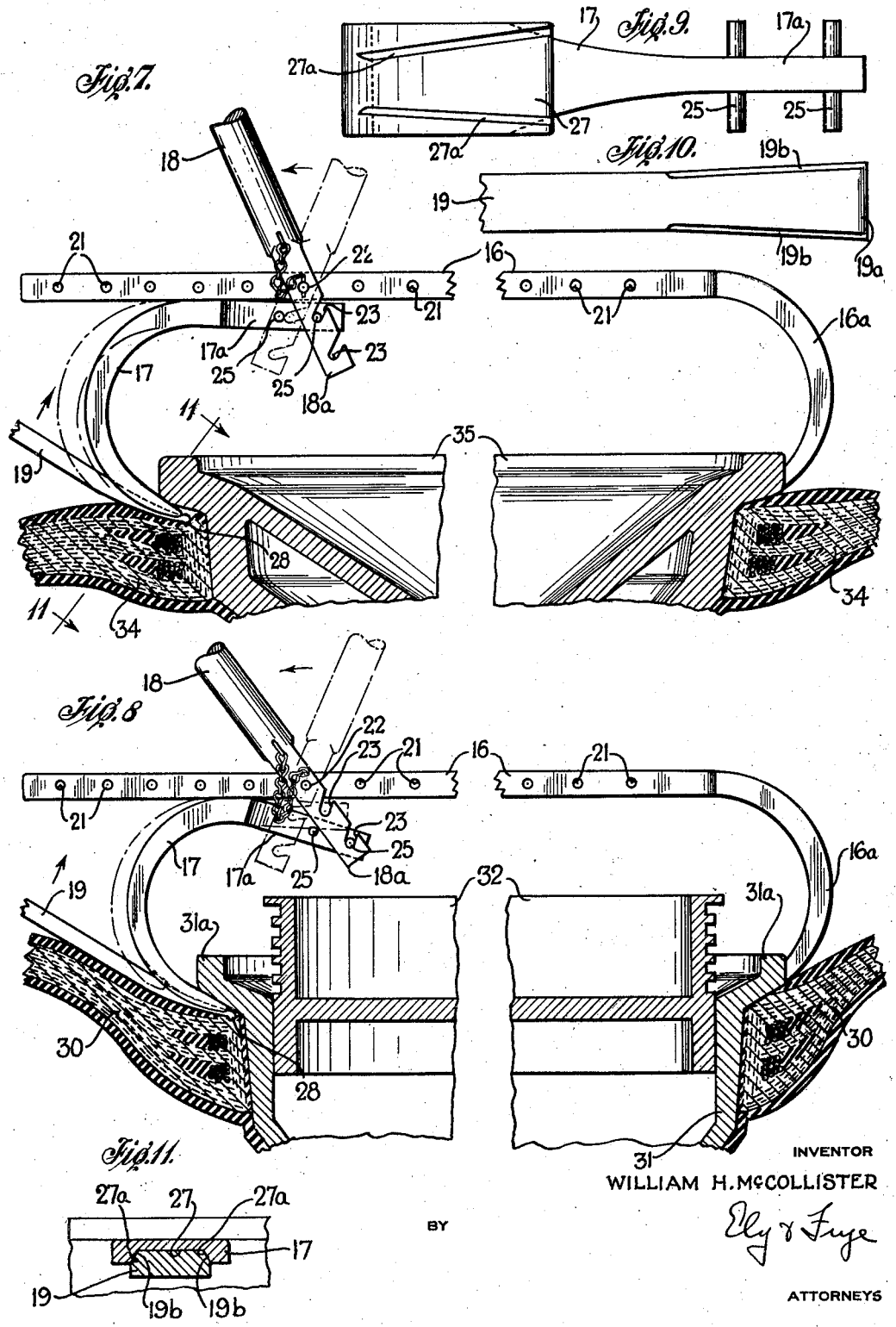

Patented July 23, 1946

2,404,583

UNITED STATES PATENT OFFICE 2,404,583

TIRE REMOVING TOOL

William H. McCollister, Akron, Ohio, assignor to The Firestone Tire & Rubber Company, Akron, Ohio, a corporation of Ohio Application June 1, 1944, Serial No. 538,276

2 Claims. (Cl. 157—6)

This invention relates to improved tire removing tools, and more especially it relates to tools of the character mentioned adapted to force the bead portions of a pneumatic tire casing laterally off the bead seats and away from the lateral flanges of a tire rim upon which the tire is mounted.

The tool is of especial utility for removing tires from "drop center" rims whereof each lateral flange is an integral portion of the rim. It is also especially suitable for removing extremely large tires, such as the tires of bomber airplanes, tires of mobile artillery, and tires used with heavy earth-moving equipment. Such tires are inherently stiff, which contributes to the difficulty of their removal. Furthermore, they frequently adhere tightly to the rims due to rust and the like, and in cases where the rims are provided with integral brake drums, the heat generated by braking friction may fuse the tires to the rims. In other cases the bead seats of the rims are sloped so that the tire beads are wedged thereon. It is common occurrence for the tire beads to cling to the rim structures with such tenacity that the vigorous effort required to free them results in damage to the tires. In some cases such damage is so severe or extensive as to ruin the tire and require the discarding thereof.

The chief objects of the invention are to provide an improved tire removing tool capable of operating upon tires on rims of various diameters; to provide a tool of the character mentioned that will not mutilate the tire upon which it is used; that provides facility of application to a tire; that is capable of exerting leverage adequate to loosen a tire from a rim; to provide for varying said leverage progressively as a tire bead is moved away from a rim flange; and to provide a tire removing tool adapted to operate with equal facility upon tires and rims of various types. More specifically, the invention aims to provide a tire removing tool comprising a lever element constructed and arranged to provide a rolling fulcrum for the latter. Other objects will be manifest as the description proceeds.

Of the accompanying drawings:

Fig. 5 is a perspective view similar to Fig. 1 showing the tire removing tool in the initial phase of operation in removing a smooth contour tire from a tire rim without brake drum;

Fig. 6 is a view of the structure shown in Fig. 5 in the succeeding phase of tire-removing operation;

Fig. 7 is a section, on a larger scale, of a fragmentary portion of a tire bead and tire rim of the type shown in Figs. 5 and 6, and work-engaging portions of the improved tire removing tool, shown in side elevation, operatively associated therewith;

Fig. 8 is a view similar to Fig. 7 showing the tire removing tool in operation upon a tire and rim of the type shown in Figs. 1 to 4 inclusive;

Fig. 9 is a bottom plan view of a hook member constituting one of the elements of the tire removing tool;

Fig. 10 is a plan view of the work-engaging end portion of a lever member constituting another element of the tool of the invention;

Fig. 11 is a section on the line 11—11 of Fig. 7 showing how the tool elements of Figs. 9 and 10 engage each other; and Fig. 12 is a perspective view of another embodiment of the invention shown in operative association with a tire rim and a tire mounted thereon.

Figure 2:
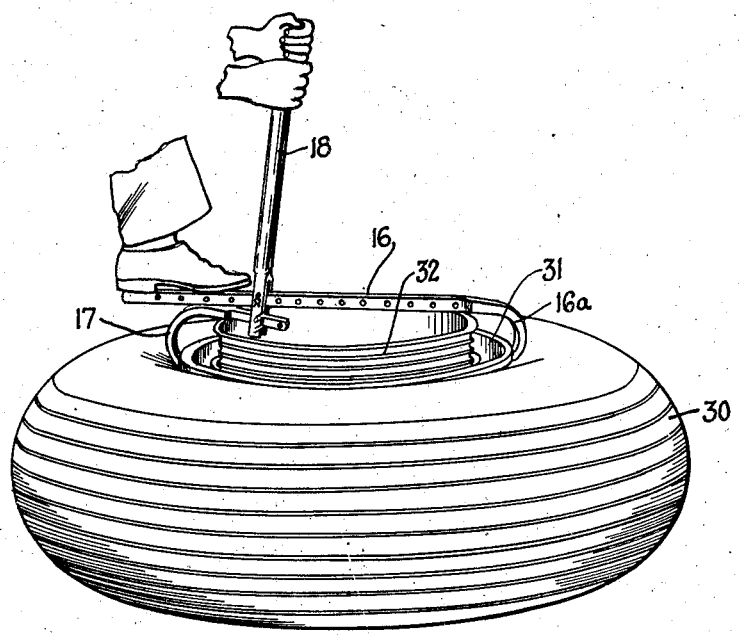
Figs. 2, 3 and 4 are views of the structures shown in Fig. 1 in succeeding phases of tire-removing operation.
Figure 1:
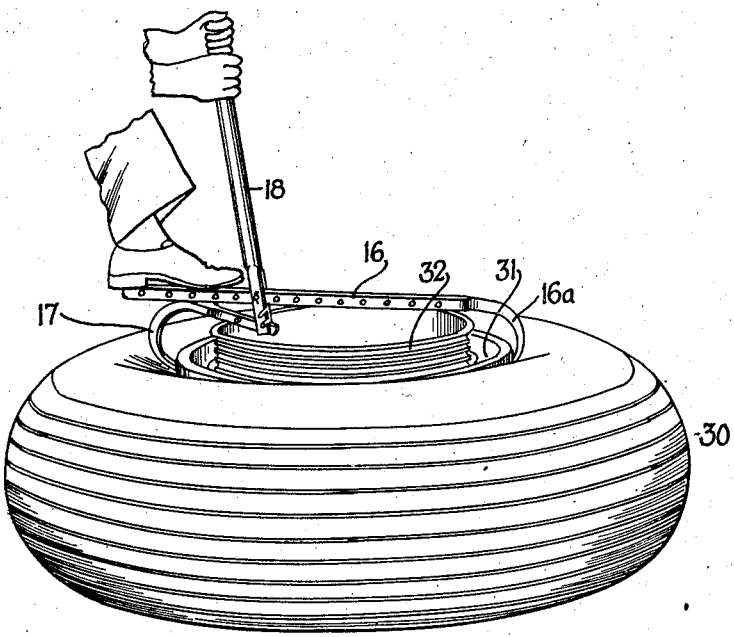
Fig. 1 is a perspective view showing the preferred embodiment of the improved tire removing tool in the intial phase of operation in removing a balloon tire from a tire rim having a brake drum mounted thereon.

Referring to the drawings, it will be seen that the essential elements of the improved tire removing tool comprise an elongate hooked bar 16, a hook 17, a hand lever 18 engageable with the bar 16 and hook 17 for moving them relatively of each other, and a lever 19 that utilizes the hook 17 as a fulcrum and is manually operated to force the bead of a tire away from the flange of a tire rim upon which the tire is mounted. Removal of a tire is facilitated by the use of a second hook 17, the same being employed in a manner hereinafter to be explained.

The hooked bar 16 is composed of metal, is formed with a hook portion 16a at one end thereof, the end or nose of said hook portion being flat or blunt as shown. Said bar also is provided throughout its length with pivotal bearing means consisting of a plurality of apertures 21, 21. The hand lever 18 consists of a rigid metal bar having a forked or bifurcated end portion 18a adapted to straddle the hooked bar 16 and pivotally connectible with the latter by means of a pivot pin 22 insertible through aligned apertures formed in the forked portion 18a of the member 18 and through one of the apertures 21 in the hooked bar 16. By inserting the pivot pin 22 in various apertures 21, the device may be adjusted for operation upon tires of various bead diameters. The bifurcated end portion 18a of lever 18 is formed with marginal recesses or notches 23, 23, which notches extend obliquely upwardly toward the margins of the fork elements, which margins face the hook portion 16a when the member 18 is in operative association with the member 16. There are two pairs of notches 23, one pair being nearer the pivot pin 22 than the other.

The hook 17 has a broad substantially flat nose portion at one end thereof adapted for insertion between the bead portion of a tire and a marginal flange on the rim on which the tire is mounted. The opposite end portion of the hook 17 is flattened laterally so as to constitute a shank 17a, which shank is receivable in the forked portion 18a of the hand lever 18, below the pivot pin 22 therein. The shank 17a of the hook is provided with a pair of studs 25, 25, said studs being spaced apart longitudinally of the hook-shank and projecting from each side thereof, said studs being receivable alternatively in either pair of notches 23 in the forked end portion of the hand lever 18.

When the bar element 16, hand lever 18, and hook member 17 are assembled in the manner described, the hand lever 18 may be moved in the direction indicated by the arrows in Figs. 7 and 8 to move said hook 17 toward the hooked end portion 16a of the bar 16. When the tool is employed for removing a tire, the hooked end 16a of the bar 16 is engaged with the flange of a tire rim, the force applied to the hook 17 being sufficient to force the latter between the rim flange and tire bead, at the diametrically opposite side of the rim, as presently will be more fully explained. Leverage applied to the hook 17 may be varied by engaging the studs 25 thereof in different recesses 23 of the hand lever 18. The simple stud and slot connection between the hook and hand lever makes the connecting and disconnecting of these elements a simple matter.

An important feature of the invention is the provision of means enabling more efficient cooperation between the hook 17 and the lever 19 that utilizes said hook as a fulcrum, as presently will appear. Such means comprises a shallow groove or recess 27 formed in the hook on the convex side thereof, said groove extending rearwardly from the nose of the hook and merging with the surface of the hook at its rear end. As is most clearly shown in Figs. 9 and 10, the lateral walls or margins 27a, 27a of said groove are beveled or sloped so that the bottom of the groove is narrower than the top thereof. Furthermore the margins 27a of the groove are disposed obliquely with relation to each other and to the centerline of the hook, and progressively converge toward each other rearwardly from the nose of the hook. The lever 19 has its work-engaging, operative end portion 19a flattened, which flattened portion is slightly arcuate longitudinally of the lever. Said flattened portion also has lateral margins that diverge toward the operative end thereof, said diverging margins being beveled at 19b, 19b on the concave side of said end portion 19a. The taper and bevel of end portion 19a of lever 19 are complemental to the taper and bevel of the lateral margins 27a of the groove 27 in the nose of hook 17, the arrangement being such as to enable interfitting of the lever and hook as is clearly shown in Fig. 11. The nose or terminus of the end portion 19a of lever 19 is formed, on the convex side thereof, with a small rib or bead 28, the function of which presently will be manifest.

Describing now the operation of the improved tire removing tool, attention first is directed to Figs. 1 to 4 inclusive and Fig. 8 of the drawings wherein the tool is shown removing a low pressure balloon tire 30 from a drop center rim 31 having a brake drum 32 attached thereto and extending axially from one side thereof. With the tire deflated and resting upon a flat horizontal surface, the tire tool is properly assembled so that hook portion 16a of the bar 16 and hook 17 will engage the tire rim. In such assembly the end or second stud 25 of hook 17 is engaged in the end notches in hand lever 18, the arrangement being such as to incline the point or nose of the hook so that it will start under the rim flange, the latter being designated 31a. Such inclining of the nose of the hook is made necessary by the curved or bulging sidewall of the tire. By pulling on the hand lever 18 in the direction indicated by the arrow in Fig. 8, the hook 17 may be started between the rim and the bead portion of the tire. After the hook is engaged, the hand lever 18 is loosened and the stud 25 (whichever stud is conveniently positioned) is engaged in the inner notches 23 of the hand lever, as shown in Fig. 2. This increases the leverage so that movement of the hand lever forces the hook down between the tire bead and rim flange. The bar 16 and hand lever 18 are then removed, leaving the hook 17 in place under the rim flange.

Figure 3:
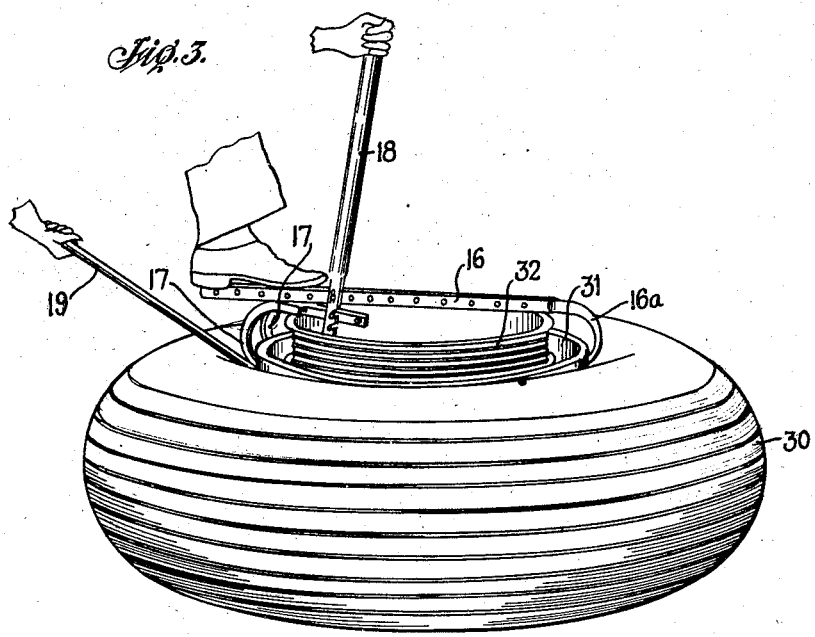
Figure 4:
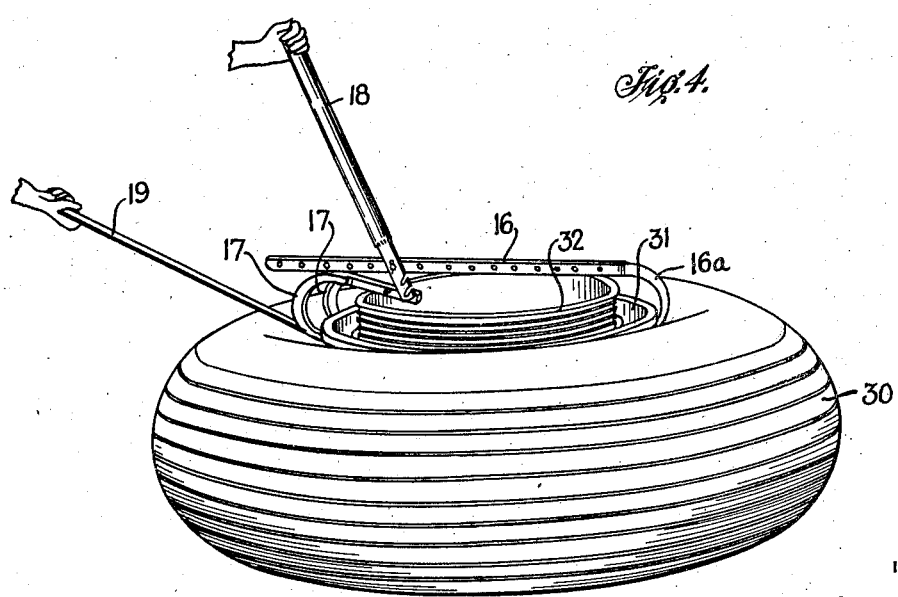

Next, a second hook 17 is positioned 3 or 4 inches away from the first hook 17, and is forced between the tire bead and rim flange by means of the bar 16 and hand lever 18 in exactly the same manner as the first hook 17. The lever 19 now is pushed between the tire bead and rim flange, beside the second hook 17, in the slight gap which has just been opened by said hook, as is shown in Fig. 3. If necessary the lever 19 may be forced firmly into place by means of a rubber-tipped hammer. The bar 16 and hand lever 18 are then released and the hook 17 next to the lever 19 is removed from the tire. Then said hook is superposed upon the work-engaging end portion of the lever 19, with the groove 27 of the convex side of the hook straddling the lever. The bar 16 and hand lever 18 are again assembled and by means thereof the hook 17 is engaged and forced toward the rim, as shown in Fig. 4. The point of the hook enters like a wedge between the rim flange 31a and the point of lever 19, forcing the latter downwardly, and also forcing it forwardly because of the inter-engagement of the nose of the lever with the groove 27 in the hook. The position of the tool parts at this time is best shown in Fig. 8. The lever 19 is then lifted in the direction indicated by the arrow in Fig. 8, to force the tire bead downwardly away from the rim flange in a local region.

As the lever 19 is lifted in the manner described, it fulcrums upon the nose portion of the hook 17, and said fulcrum progresses or rolls rearwardly from the nose of the hook and the lever as the angular position of the lever increases. Thus it will be seen that the lever has greatest mechanical advantage when it is initially applied, and that as its mechanical advantage decreases the arc of movement of its operative end portion increases and thereby imparts sufficient movement to the tire bead to move a substantial local region thereof off the bead seating portion of the rim. The complementally beveled margins of the lever 19 and hook-groove 27 enable the lever readily to be received in said groove, and the complemental taper of said groove and the lever portion received therein prevent relative longitudinal movement of lever and hook as leverage is applied to the tire bead. Slippage of the lever relatively of the hook also is opposed by the rib 28, on the nose of the lever, which rib presses into the heel of the tire bead during the prying operation described. Said rib also prevents mutilation of the tire bead by the lever as the end of the latter moves relatively of the tire bead.

The operation described is repeated at several points circumferentially of the tire until one bead thereof is completely loosened from the tire rim. The tire is then reversed and the same procedure followed to loosen the other tire bead from the rim. The tire may then be removed from the rim in the usual manner.

The operation of removing a smooth contour tire from a rim is shown in Figs. 5, 6 and 7 of the drawings wherein the tire is designated 34 and the rim, of drop center type without brake drum, is designated 35. The tire tool is assembled in the manner previously described except that the outer stud 25 of the hook 17 is engaged in the upper notches 23 of the hand lever 18, as shown in Fig. 5. The tool is then applied to the tire and the hook forced between the tire bead and the rim flange. The hook is then disengaged from the tool, and a second hook 17 is inserted in the same manner about 3 or 4 inches from the first hook, as is clearly shown in Fig. 6. The remainder of the operations are identical with the steps employed for removing a balloon tire from a rim, so that a description thereof need not be repeated. In Fig. 7 is shown how the lever 19 is employed.

The improved tool is adjustable and may be utilized for removing tires of all sizes from their rims. The invention makes it possible to loosen the most tightly mounted tires without mutilation or other damage thereto, and achieves the other objects set out in the foregoing statement of objects.

The embodiment of the invention shown in Fig. 12 is adapted for operation upon but one size and type of tire and rim. The tool shown comprises an elongate metal bar 37 formed with a hook portion 38 on an end thereof, and another elongate bar 39 formed with a hook portion 40 on an end thereof. The bar 37 has a pair of loops or straps 41, 41 welded thereto at spaced points thereon, the straps 40 being arranged loosely to embrace the bar 39 in the assembled condition of the tool. The arrangement is such as to enable the bars to move longitudinally relatively of each other, and to move toward and away from each other to a limited extent. A hand lever 42 has a forked end portion that is pivotally connected to the bars 37 and 39 by removable pivot pins 43 and 44 respectively. The arrangement is such that by oscillating the hand lever 42 the bars 37, 39 may be moved longitudinally relatively of each other, whereby the hook portions 38, 40 of said bars are moved toward each other for the purpose of forcing the nose portion of hook 40 between a tire bead and a rim flange. The hook portion 40 of bar 39 has its nose formed with a central tapered groove (not shown) similar to the groove 27 of hook 17 of the previously described embodiment of the invention, and a lever 45, identical with lever 19 is provided and is adapted to use the hook structure 40 as a fulcrum for forcing a tire bead away from a rim flange in the previously explained manner characteristic of the invention.

The tire removing tool shown in Fig. 12 is essentially similar to the embodiment of the invention first described, it operates substantially in the same manner as the latter, and achieves substantially all of the advantages set out in the statement of objects of the invention.

Other modification may be resorted to without departing from the spirit of the invention or the scope thereof as defined by the appended claims.

What is claimed is:

1. In a tire removing tool of the character described, the combination of a prying lever having an operative end portion adapted to enter between a tire bead and a tire rim flange, a hook member engageable with a tire rim flange at one side thereof, a second hook member adapted to enter between said tire rim flange and the end portion of the prying lever therebeneath, a hand lever connectible to said hook members and operable to apply leverage thereto to draw them toward each other and thus to force the second hook member farther beneath the tire bead flange, and inter-engaging means on the second hook member and the operative end of the prying lever adapted to move the said prying lever with said second hook member as the latter is forced beneath said rim flange, said second hook member constituting a rolling fulcrum for the prying lever when the latter subsequently is operated to loosen the tire from the rim.

2. In a tire removing tool of the character described, hook members adapted to engage a tire rim simultaneously at diametrically opposed points and to enter between a tire bead and a tire rim flange, means for applying a force between said hook members to draw them toward each other, and thus to urge said hook members simultaneously between the tire bead and the rim flange, a prying lever having an operative end portion adapted to enter between one of said hook members and the tire bead and interengaging means on said latter hook member and said prying lever adapted to move said prying lever with said hook member as the latter is forced beneath said rim flange, said latter hook member constituting a rolling fulcrum for said prying lever when the latter subsequently is operated to loosen the tire from the rim.

WILLIAM H. McCOLLISTER.